United States Patent

[11] 3,567,864

[72] Inventors George E. Palmer
Hinsdale;
Peter W. Smith, Lombard, Ill.
[21] Appl. No. 707,730
[22] Filed Feb. 23, 1968
[45] Patented Mar. 2, 1971
[73] Assignee Culligan Inc.
Northbrook, Ill.

[54] MONITORING AND REPORTING SYSTEM
9 Claims, 4 Drawing Figs.

[52] U.S. Cl. .......... 179/5
[51] Int. Cl. .......... H04m 11/04
[50] Field of Search .......... 179/5, 2 (TC,R); 340/416, 244, 293, 309.4

[56] References Cited
UNITED STATES PATENTS

| | | | |
|---|---|---|---|
| 2,726,377 | 12/1955 | Hammer | 340/163 |
| 3,347,987 | 10/1967 | Chaloudka | 179/2 |
| 3,401,234 | 9/1968 | Heald | 179/2 |

*Primary Examiner*—Kathleen H. Claffy
*Assistant Examiner*—David L. Stewart
*Attorney*—Wilson & Geppert ABSTRACT: A monitoring and reporting system utilized to check on the condition of a water circulating and treating system by means of a private telephone line where the dialing of the number for a telephone set at the situs of the system and the ringing of the telephone sets a control circuit into operation. The circuit includes a timer motor rotating a series of cams for snap switches which, when closed, actuate a circuit to sense a condition of the system and provide a short interval audible signal that is picked up by the telephone receiver. One snap switch actuates a device which lifts the cradle for the telephone handset, and a series of buzzers are positioned adjacent the receiver which are connected to the condition indicators such as for conductivity, pH level, and chemical solution levels in the solution containers. The signals are controlled by the timer motor to be actuated at fixed time intervals.

Inventors
George E. Palmer
Peter W. Smith
by: Wilson & Geppert
Att'ys

Inventors
George E. Palmer
Peter W. Smith
by: Wilson & Geppert
Atty's

Inventors
George E. Palmer
Peter W. Smith
by: Wilson & Geppert
Att'ys

MONITORING AND REPORTING SYSTEM

The present invention relates to a monitoring and reporting system, and more particularly to a telephone monitoring system for the checking of variable factors in a water circulating or treating system initiated by dialing of the telephone number corresponding to a telephone receiver at the site of the treating system.

Presently available means for reporting a malfunction in a control system utilize the closing of a switch upon the occurrence of the malfunction or the exceeding of a predetermined limit or range which will actuate a telephone device to dial a preset number and actuate a tape recorder or other signalling device which will indicate the malfunction to a person answering the telephone carrying the preset number. However, such a system is limited to the indication of a single variable as being outside of predetermined limits. The present invention, however, provides for the indication of the status of a number of variables in a control system at any time.

Among the objects of the present invention is the provision of a monitoring and reporting system for a water circulating and treating system whereby any number of variables in the system can be checked at any time. The monitoring is initiated by a serviceman or other authorized person through the dialing of a certain telephone number associated with the system being monitored. The telephone number is associated with a telephone at the location of the monitoring system and connected to a timer control system which does not interfere with the normal mode of operation of the telephone. Thus, the telephone number can be dialed at any time to monitor the system.

Another object of the present invention is the provision of a telephone monitoring and reporting system for a water circulating and treating system having a timer control actuated by the ringing of the telephone, and the timer in turn actuates a series of circuits providing signals at predetermined time intervals to indicate the variable conditions in the treating system. The timer includes a timer motor which rotates a plurality of actuating cams for a series of snap switches. Energization of the timer is caused by the operation of the bell coil in the telephone when the number is dialed. One circuit actuated by a snap switch is a holding circuit to provide for a complete cycle of operation of the timer to monitor all conditions in the system. The other switches actuate circuits for signalling the conditions present in the treating system.

A further object of the present invention is the provision of a telephone monitoring and reporting system for a water circulating and treating apparatus wherein the telephone receiver is removed from its cradle and one snap switch controls a circuit to actuate a relay to lift the empty cradle. A series of buzzers are mounted adjacent the telephone reciever and are actuated at predetermined time intervals to indicate conditions of conductivity, pH level, and chemical solution level in containers, or other desired variables.

The present invention also comprehends the provision of a telephone monitoring and reporting system having a control timer wherein each snap switch on the timer is actuated in a predetermined time sequence to actuate circuits for a conductivity indicating device, a pH level indicating device and for determining the solution level in chemical solution containers. Each circuit is also connected to one or more buzzers or signalling means which indicate the condition of the system audibly over the telephone.

Further objects are to provide a construction of maximum simplicity, efficiency, economy and ease of assembly and operation, and such further objects, advantages and capabilities as will later more fully appear and are inherently possessed thereby.

Figure 1:
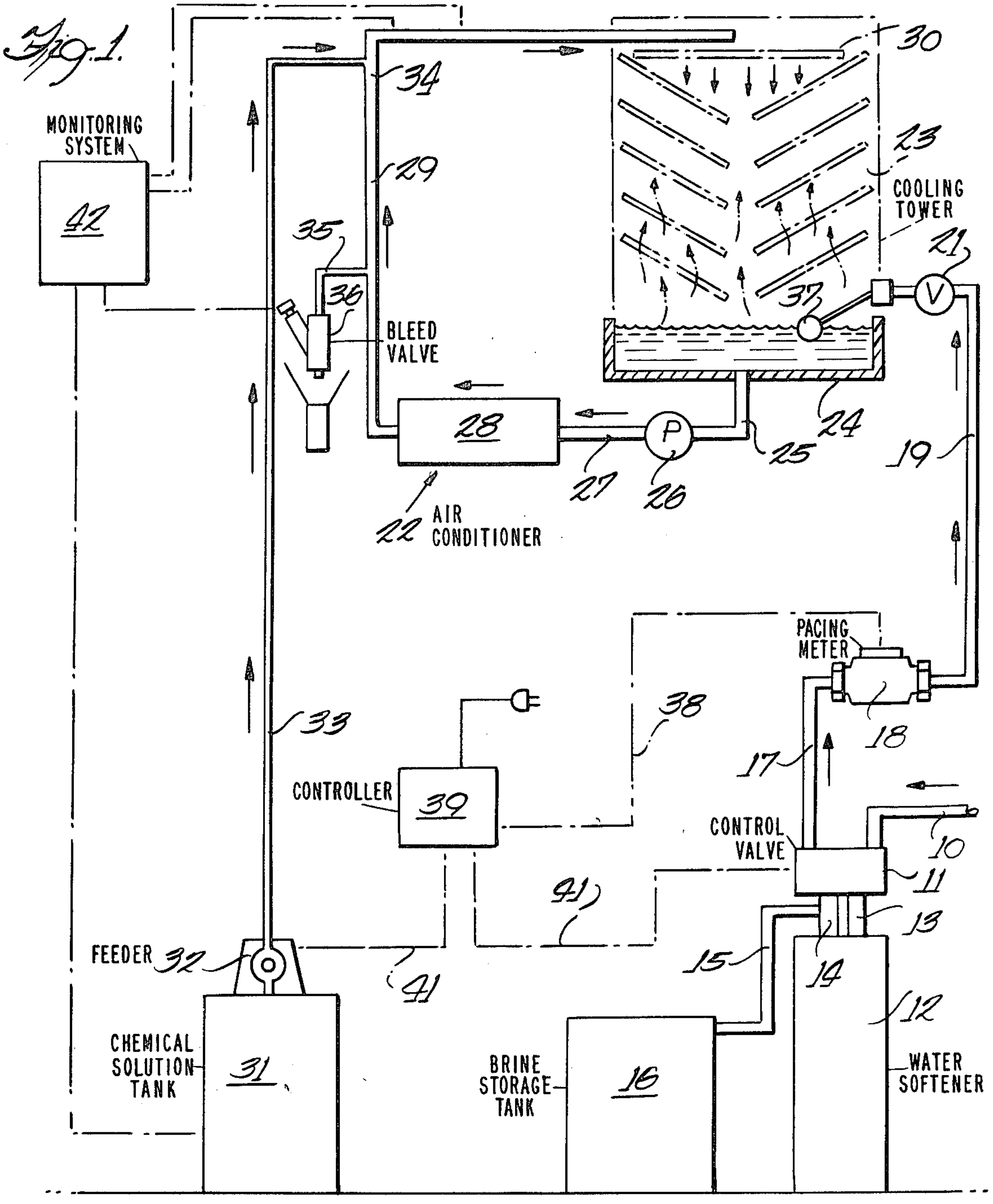
FIG. 1 is a schematic showing of water circulating and treating system for a cooling tower with the control system for treating the recirculating water and a monitoring system for indicating the variable conditions of the water circulating system.

Referring more particularly to the disclosure in the drawings wherein is shown an illustrative embodiment of the present invention, FIG. 1 discloses a cooling tower system, similar to that shown in the Edward G. Kreusch and Edwin A. Morrison copending application Ser. No. 637,731, now U.S. Pat. No. 3,450,265, entitled "Recirculating Water Treatment and Control System," assigned to the assignee of the present application, having an untreated water inlet conduit 10 leading to the control valve 11 of a water softening tank 12. The water softening tank 12 has an inlet 13 and an outlet 14 leading to the valve 11, and a brine conduit 15 leads to a brine storage tank 16 for a brine solution supply to periodically regenerate the water softening resin in the tank 12.

From the control valve 11, a conduit 17 leads to a pacing water meter 18, and a conduit 19 communicates between the meter and a reservoir 24 for a cooling tower 23. A float-controlled valve 21 is located in line 19 to control flow of makeup water to the system. The cooling tower 23 is a part of a recirculating water system 22 having a conduit 25 from the reservoir 24 leads to a recirculating pump 26, and water is pumped through conduit 27 to a device 28, such as an air conditioner, requiring the cooled water. The effluent water proceeds through conduit 29 to a distributor 30 at the top of the tower 23 where the water passes downwardly to the reservoir 24, and air is drawn upwardly through the tower by a circulating fan in a manner known in the art.

For the purpose of preventing scale and corrosion, as well as the formation of biological growth and any other undesirable substances, it is desirable to add certain chemicals to the water in the system 22, and one or more chemical solution storage tanks 31 are utilized with a chemical feeder 32 for each storage tank. The feeder 32 feeds a measured amount of chemical solution through a branch conduit 33 to enter conduit 29 at the point 34. Also, a bleed line 35 is connected to conduit 29 and to a bleedoff or blowndown control valve 36 for bleeding off measured amounts of liquid to control the concentration of impurities in the circulating water.

A substantially constant quantity of water is circulating in the system 22 at all times of operation, with the makeup water from conduit 19 replacing water lost due to evaporation and the water being bled off through the control valve 36. In order to accurately and systematically feed the chemical solutions and control the quantity of brine regenerant for regeneration of the water softener, the pacing meter 18 measures the quantity of makeup water fed to the reservoir as the valve 21 is actuated by the float level in the cooling tower reservoir 24. The flow of a predetermined amount of water through the meter 18 is translated into an electrical impulse which is transmitted through the circuit 38 to an electric controller 39. This controller then actuates, through circuits 41, for predetermined time intervals, the chemical feeder 32 and the refill solenoid valve in the water softener control valve 11, as more specifically disclosed in the above cited Kreusch and Morrison pending application.

Figure 2:
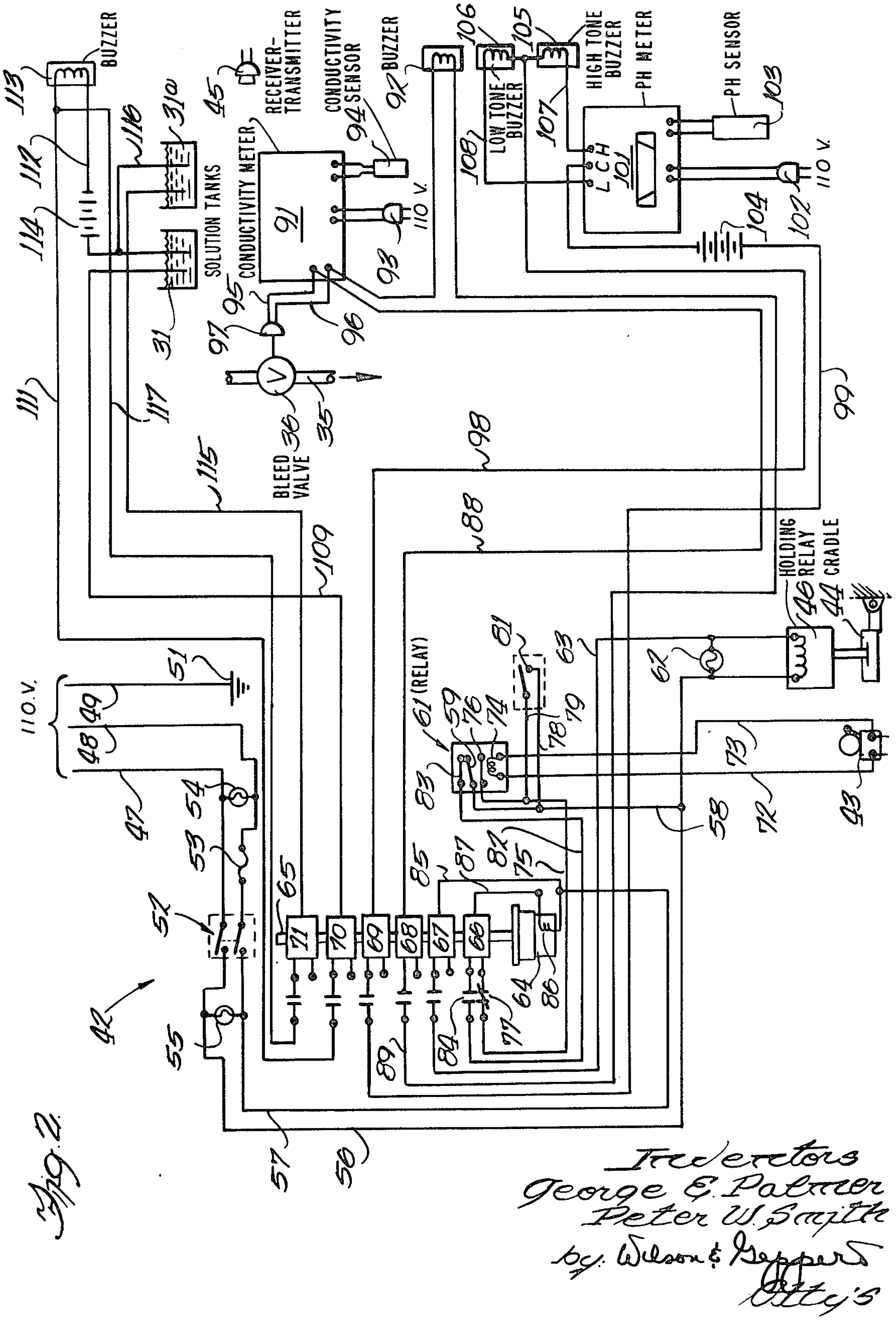
FIG. 2 is a schematic showing of the circuit utilized for the monitoring of the variable conditions in the system.

Although the controller 39 provides substantially trouble-free operation of the cooling tower recirculating system 22, there are certain variable factors, such as conductivity or pH level of the circulating water which should be checked periodically during operation. Obviously, a technician could be present during operation of the system; however, it would be advantageous to be able to check one or more of these systems from a central servicing point and dispatch a serviceman if any condition requires correcting. A monitoring system 42 is shown in FIG. 2 for monitoring and reporting variable conditions utilizing a telephone to monitor the water circulating system 22. The telephone has a bell 43 actuated by dialing the number of telephone, a cradle 44 and a receiver 45, however, a holding relay 46 cooperates with the empty cradle 44 to lift the cradle as the receiver 45 is positioned off of the cradle adjacent a series of audible signals to be described later.

The control monitoring circuit is connected to a 110 volt source of power through leads 47, 48 and 49, lead 49 being connected to a ground 51. The leads 47 and 48 are connected to a push-pull double pole switch 52, the line 48 containing a fuse 53, and a signal light 54 is positioned across the lines 47, 48 prior to the switch. Beyond the switch a second signal light 55 is positioned between the lines 56 and 57; line 56 extending to the holding relay 46 with a branch line 58 leading to the pivoted arm 59 of a relay 61. The line 57 is connected to the timer motor 64 and a signal light 62 is connected between the line 56 and a line 63 leading from the other end of the coil of relay 46. The timer motor 64 provides a revolution over a predetermined time interval to a shaft 65 carrying a series of cams (not shown) to actuate the snap switches 66, 67, 68, 69, 70 and 71.

The line 63 from relay 46 extends to the contact of snap switch 67, which switch actuates the relay 46 to lift the empty cradle 44. Lines 72 and 73 extend from the bell 43 to a coil 74 of the relay 61 for a purpose to be later described. A line 75 extends between the normally open contact 76 of the relay 61 and the normally closed contact 77 of the snap switch 66. Also branch lines 78, 79 intersect lines 58 and 75, respectively, for a test switch 81. A line 82 extends between the normally closed contact 83 of the relay 61 and the normally open contact 84 of the snap switch 66. A line 85 extends from the switch 67 to one end of coil 86 of the timer motor 64, and a line 87 from snap switch 66 extends to the opposite end of coil 86.

The snap switch 68 is connected through lines 88, 89 to a conductivity meter 91 and to a first buzzer 92 in parallel therewith. The conductivity meter 91 has a 110 v. source 93 and a conductivity sensor 94 inserted in the line 29. A pair of leads 95, 96 are connected to a solenoid 97 of the bleed valve 36 in the conduit 35 (FIG. 1). The bleed valve 36 is actuated by the conductivity meter 91 when the sensor 94 indicates that the conductivity of the liquid in line 34 is above a prescribed minimum and water is bled through the line 35 and valve 36; makeup water entering the system 22 when the float 37 opens the valve 21 in conduit 19.

Snap switch 69 is connected through lines 98, 99 to a pH meter 101 having a 110 v. source 102 and pH sensor 103. A 6 volt battery 104 is connected in line 99 to actuate the high and low tone buzzers 105,106. The lead 98 is a common line to both buzzers and lines 107, 108 connect the buzzers to high and low contacts on the pH meter; the line 99 being connected to the common terminal. If the pH level is too high, the meter closes the circuit between lines 99 and 107 for actuation of the high buzzer 105. Likewise, a low pH level closes the circuit of lines 99 and 108 for actuation of low buzzer 106.

The last two snap switches 70 and 71 are to indicate the solution level in the containers 31. If only one container 31 is used, the snap switch 70 is alone used with line 109 going to the container 31 with the end or electrode immersed in the solution therein. A line 112 has an end or electrode immersed in the solution and is connected to a buzzer 113; a 6 volt battery 114 being inserted in line 112 for the voltage required by the buzzer. The line 111 extends from the buzzer 113 to the other side of the snap switch 70. If a second solution container $31^a$ for another additive is utilized, the snap switch 71 has a line 115 extending to and terminating in an end or electrode immersed in the solution in the container $31^a$. A branch line 116 having an end or electrode in the solution extends from the container $31^a$ to intersect the line 112, and a line 117 from the other side of the switch 71 intersects the line 111. As seen in FIG. 2, the buzzers 92, 105, 106 and 113 are grouped adjacent the telephone receiver 45 so as to be audible to the serviceman calling the telephone number to check on the system 22.

Considering the operation of this monitoring system 42, the cams for the snap switches 68,69,70 and 71 are arranged so that the snap switches are actuated in sequence with predetermined time intervals between each switch. To initiate operation of the monitoring system, the serviceman at a central service point dials the telephone number for the monitoring telephone. The telephone bell 43 rings thus closing the circuit and actuating the relay coil 74 of relay 61 to close the circuit through lines 58 and 75 to the normally closed contact of snap switch 66. Thus a circuit is completed from the power source lines 47, 48 and closed switch 52 through line 56, branch line 58, contacts 59 and 76, line 75, normally closed contact 77 of snap switch 66, line 87, coil 86 of motor 64, and line 57.

For each short actuation of the bell 43, the timer motor 64 is actuated to rotate the shaft 65 and associated cams until the cam of switch 66 opens the contact 77 and closes the contact 84. As the relay arm 59 will normally return to engage contact 83 when the bell 43 stops ringing, the closing of contact 84 provides a holding circuit for the motor 64 through lines 56 and 58, arm 59, contact 83, line 82, contact 84 of switch 66, line 87, coil 86 of motor 64 and line 57 so that the motor can operate for one complete monitoring cycle.

Substantially simultaneously with the closing of contact 84, the snap switch 67 closes the circuit through line 56, the coil of relay 46, line 63, switch 67, line 85, coil 86 of the timer motor 64, and line 57 to actuate the relay 46 and lift the empty cradle 44 of the telephone to connect the telephone receiver with the serviceman. After a short time interval, the switch 68 closes the circuit 88, 89 to the conductivity meter 91, and if no sound from the buzzer 92 is heard, the conductivity of the water is below the predetermined maximum level. If a buzz is heard, the conductivity of the water in the system 22 is sufficiently high that the bleedoff valve 36 is actuated.

After another short interval, the switch 69 closes the circuit 98, 99 to check the pH level of the circulating water. If the pH is too high, the high-pitched buzz from buzzer 105 is heard, or if the pH is too low, the low buzz from buzzer 106 is heard. If there is no buzz, the pH level is within acceptable limits. After another time interval, the switch 70 closes circuit 109, 111 and if the buzzer 113 emits a buzz, the solution container 31 is not empty. Similarly, after another time interval, the switch 71 closes to indicate whether the container $31^a$ is empty. Shortly after actuation of switch 71, the switch 66 opens contact 84 and closes contact 77, which deenergizes the relay 46 to drop the cradle and cut off the telephone circuit.

The circuit light 54 indicates whether power is available to the switch 52, signal light 55 indicates whether the switch is closed, and signal light 62 indicates whether a monitoring cycle is in operation to anyone working around the recirculating water system 22.

Figures 3, 4:
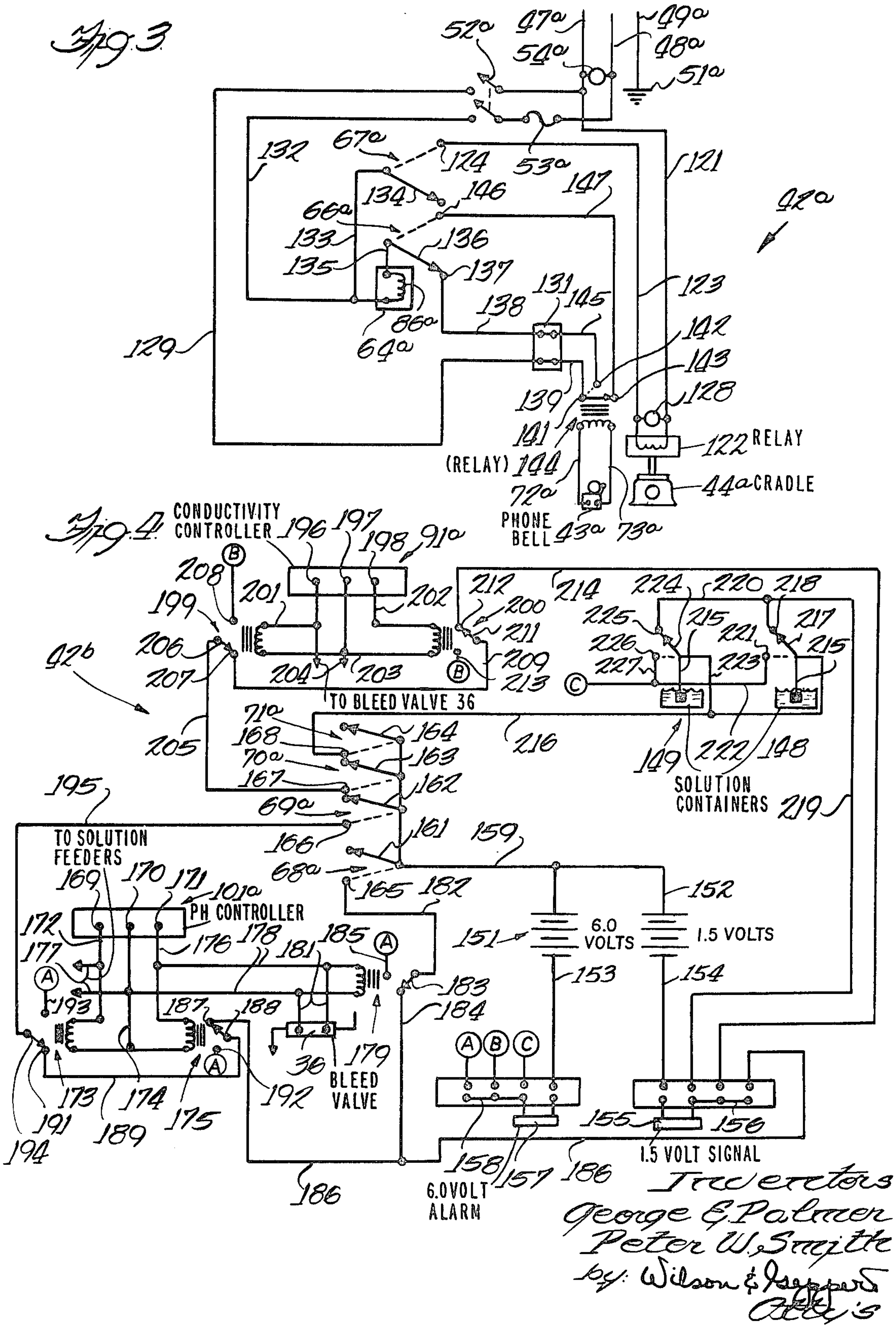
FIG. 3 is a partial schematic showing of a modification of a flip-flop circuit for the monitoring system.
FIG. 4 is a schematic showing of a modification of the alarm system portion of the monitoring circuit.

With reference to FIGS. 3 and 4 of the drawings, these FIGS. disclose a modified monitoring circuit with FIG. 3 disclosing the flip-flop or holding portion $42^a$ of the circuit, and FIG. 4 showing the signalling and reporting system $42^b$ of the circuit. In FIG. 3, a 110 volt source of power is connected to the flip-flop circuit $42^a$ through leads $47^a$, $48^a$ and $49^a$; lead $49^a$ being connected to a ground $51^a$. Leads $47^a$, $48^a$ are connected to a single-throw double-pole on-off switch $52^a$, and a signal light $54^a$ is connected in parallel to the switch. A fuse $53^a$ is interposed in lead $48^a$.

A line 121 intersects the line $47^a$ and communicates to one side of a coil of a relay 122, the opposite side of the coil having a line 123 to a normally open contact 124. Said relay 122 operates to lift the cradle $44^a$ in the manner disclosed in the first embodiment shown in FIG. 2. A signal light 128 is connected in parallel with the relay 122 to indicate when a monitoring operation is occurring.

A line 129 from the switch $52^a$ is connected to a momentary contact switch 131, and the other line 132 from the switch $52^a$ is connected to one end of the coil $86^a$ of motor $64^a$ and has a branch line 133 connected to the switch arm 134 of cam-actuated switch $67^a$. The opposite end of coil $86^a$ is connected by line 135 to a switch arm 136 of cam-actuated switch $66^a$. The switch arm 136 engages normally closed contact 137 connected to the momentary contact switch 131 by line 138. One line 139 of switch 131 is connected to a common terminal on the relay arm 141 while the other line 145 is connected to the normally open contact 142 of relay 144. Normally open contact 146 of switch $66^a$ is connected through line 147 to the normally closed contact 143. The coil of relay 144 is connected to the phone bell $43^a$ through lines $72^a$ and $73^a$.

In this simplified flip-flop or holding circuit $42^a$, the monitoring system is initiated by the dialing of the telephone number to ring the bell $43^a$; which in turn actuates the relay 144 to cause the arm 141 to momentarily engage the open contact 142 and complete the circuit through closed switch $52^a$, line 129, switch 131, line 139, relay arm 141, contact 142, line 145, switch 131, line 138, contact 137, arm 136 of cam-actuated switch $66^a$, line 135, coil $86^a$ of motor $64^a$ and line 132. As in the previous embodiment, one or more rings of the phone coil $43^a$ are required to intermittently actuate the motor $64^a$ and rotate the shaft thereof for a sufficient arc of rotation to cause the cam to actuate switch $66^a$ and move switch arm 136 to engage normally open contact 146 and provide a holding circuit through line 129, switch 131, line 139, relay arm 141, normally closed contact 143, line 147, contact 146, switch arm 136, line 135, coil $86^a$ of motor $64^a$ and the line 132 to rotate the motor through a complete cycle until the switch arm 136 of cam-actuated switch $66^a$ is returned to engage contact 137.

Substantially simultaneously with actuation of the cam-actuated switch $66^a$, the cam-actuated switch $67^a$ has the switch arm 134 moved to engage contact 124 and actuate the relay 122 to lift the empty cradle $44^a$ through a circuit from lines 132 and 133, switch arm 134, contact 124, line 123, relay 122 and line 121. Actuation of the relay 122 actuates the signal light 128. When the motor $64^a$ has made a complete revolution, the cam of cam-actuated switch $67^a$ returns switch arm 134 to inoperative position. The momentary contact switch functions in substantially the same manner as the switch 81 in FIG. 2, in that the switch normally allows current to pass from line 129 to line 139 and from line 138 to line 145, but the switch 131 can be closed across lines 129 and 138 to test the motor circuit.

FIG. 4 discloses the monitoring and reporting circuit $42^b$ which has cam-actuated switches $68^a$, $69^a$, $70^a$ and $71^a$ operated by suitable cams rotated by the shaft of motor $64^a$ of FIG. 3. The cams are adjusted to operate the switches in a suitable sequence to indicate the functioning of the pH controller $101^a$ and the conductivity controller $91^a$, and the level of solution in containers 148, 149. The power source for the alarms or signals of the various controllers consists of a 6.0 volt battery 151 in line 153 and a 1.5 volt battery 152 in line 154. A 1.5 volt signalling device 155 is connected on one side to the line 154 and on the other side to a common line 156 to be later described. Likewise a 6.0 volt alarm 157 is connected on one side to the line 153 and on the opposite side to a common line 158. A line 159 is connected to the lines 153 and 154 and also to the switch arms 161, 162, 163 and 164 of the cam-actuated switches $68^a$, $69^a$, $70^a$ and $71^a$, respectively.

Looking first at the pH controller $101^a$, this controller has three contacts 169, 170 and 171 for high, in range, and low pH readings, respectively. All of the switches $68^a$, $69^a$, $70^a$ and $71^a$ are in normally open positions and have contacts 165, 166, 167 and 168, respectively. A line 172 is connected to high contact 169 and to the coil of a high level relay 173. The "in range" contact 170 is connected by line 174 to both the coil of high level relay 173 and the coil of low level relay 175; the low contact 171 being connected to the coil of relay 175 by line 176. Branch lines 177, 177 are connected to lines 172 and 174, respectively, and actuate one or more solution feeders 32 of FIG. 1 for feeding acid into the circulating water system. Branch lines 178, 178 are connected to lines 174 and 176, respectively, for a coil of a latching relay 179, and branch lines 181,181 lead from lines 178,178 to actuate the solenoid of the bleed valve 36 (see FIG. 1).

A line 182 connects contact 165 of cam-actuated switch $68^a$ to the switch arm 183 of latching relay 179 with the relay arm normally engaging the contact of line 184; the relay also having a normally open contact 185 communicating with contact A connected to the common line 158 of the 6.0 volt alarm 157. A line 186 connects the line 184 with the common line 156 of the 1.5 volt signal 155 and also is connected to the normally closed contact 187 of low level relay 175 and through switch arm 188 and line 189 to the normally closed contact 191 of high level relay 173. Relay 175 has a normally open contact 192 and relay 173 has a normally open contact 193, both contacts connected with contact A. The switch arm 194 of relay 173 is connected to contact 166 of cam-actuated switch $69^a$ by line 195.

The conductivity controller $91^a$ also has contacts 196, 197 and 198 for high, in range and low conductivity, respectively. This controller also has a high level relay 199 and a low level relay 200; the coil of the high level relay 199 being connected to the high contact 196 by line 201, the coil of low level relay 200 being connected to the low contact 198 by line 202, and the coils of both relays being connected to the "in range" contact 197 by line 203. Branch lines 204,204 are connected to lines 201,203 for actuation of the solenoid of bleed valve 36. High level relay 199 has a switch arm 206 connected by line 205 to the contact 167 of switch $70^a$, a normally closed contact 207 connected by line 209 to switch arm 211 of low level relay 200, and a normally open contact 208 connected to contact B on the common line 158. Low level relay 200 has a normally closed contact 212 connected to line 214 leading to common line 156 and a normally open contact 213 connected to contact B.

With respect to the solution tanks 148,149 for supplying solution to the feeder 32, each tank has a switch with a switch arm being actuated by a float 215 between a low level position and a high level position. A line 216 leads from the contact 168 of cam-actuated switch $71^a$ to the switch arm 217 of tank 148 and a branch line 223 connects line 216 with switch arm 224 of tank 149. Each tank has a high solution level contact 218,225 (both shown closed in FIG. 4) with contact 218 connected with line 219 leading to common line 156, and branch line 220 connecting contact 225 with line 219. Each tank also has a low level contact 221,226 with line 222 from contact 221 and branch line 227 from contact 226 connected to the contact C.

Now considering operation of this monitoring system, at the time of the monitoring test, the pH will either be high, low or in the proper range. If the pH is high, the pH controller 101 a will energize the high level relay 173 through lines 172,174 and will energize the acid solution feeder 32 through lines 177,177. Energization of the high level relay 173 will close the normally open contact 193 and will sound the 6.0 volt alarm 157 when cam-actuated switch $69^a$ closes through the circuit from the 6.0 volt battery 151, lines 153 and 159, switch arm 162, contact 166, line 195, relay switch arm 194, contact 193, contact A, common line 158 and alarm 157.

If the pH is in range, the contacts 191 and 187 of relays 173 and 175 are closed, and the contact 184 of latching relay 179 is closed so that closing of either switch $68^a$ or $69^a$ will actuate the 1.5 volt signalling device 155. When switch $68^a$ closes, a circuit is initiated through the battery 152, lines 154 and 159, arm 161, contact 165, line 182, arm 183, lines 184 and 186, common line 156 and signalling device 155. When switch $69^a$ closes, the circuit is actuated through battery 152, lines 154 and 159, arm 162, contact 166, line 195, relay arm 194, contact 191, line 189, relay arm 188, contact 187, line 186, common line 156 and signalling device 155.

If the pH is low, the controller $101^a$ will actuate the low level relay 175 through lines 174,176 and latching relay 179 through lines 174,176 and 178. Also, the bleed valve 36 is opened by actuation of the solenoid through lines 181,181. Due to the nature of the latching relay, the switch arm 183 will engage contact 185 if the pH has at any previous time been low until the latching relay is deliberately unlatched. Therefore, if the pH is or ever has been low, closing of the cam-actuated switch $68^a$ will sound the 6.0 volt alarm 157 through the circuit from 6.0 volt battery 151, lines 153 and 159, arm 161, contact 165, line 182, arm 183 of latched relay 179, contact 185, contact A, common line 158 and alarm 157. Also, upon closing switch $69^a$, a circuit is initiated from battery 151 through lines 153 and 159, arm 162, contact 166, line 195, arm 194, contact 191, line 189, arm 188, contact 192, contact A, common line 158 and alarm 157.

To summarize the operation of the pH controller, the sounds for the PH conditions which exist at the time of the test are shown in the following table:

TABLE I

| pH | Sound |
|---|---|
| high | 6 v. alarm - switch $69^a$ |
| low | 6 v. alarm - switch $69^a$ |
| in range | 1.5 v. signal - switch $69^a$ |
| previously low | 6 v. alarm - switch $68^a$ |
| never low | 1.5 v. signal - switch $68^a$ |

As the switches $68^a$ and $69^a$ are actuated in sequence by their cams actuated by the motor $64^a$, the combination of signals upon actuation of these two switches gives a fairly complete picture of the present and past pH condition of the system. Obviously, different combinations of the alarm and signal system could be devised.

Considering the conductivity controller $91^a$, the conductivity at the time of the test will either be high, low or in range. If the conductivity is in range, the high and low level relays 199,200 will be positioned as shown in FIG. 4 and a circuit will be completed to the 1.5 volt signalling device through the battery 152, lines 154 and 159, switch arm 163, contact 167, line 205, relay arm 206, contact 207, line 209, relay arm 211, contact 212, line 214, common line 156 and signalling device 155 when the switch $70^a$ is closed. If the conductivity is either too high or too low, the 6.0 volt alarm 157 is actuated. For a high conductivity, the controller actuates the high level relay 199 through lines 201, 203 and simultaneously the solenoid for the bleed valve 36 is actuated through lines 204,204. Actuation of the relay 199 completes a circuit to actuate the 6.0 volt alarm 157 through battery 151, lines 153 and 159, switch arm 163, contact 167, line 205, switch arm 206, contact 208, contact B, common line 158 and alarm 157.

Similarly, if the conductivity is low, the controller $91^a$ will actuate the low level relay 200 through lines 202,203. Then upon closing of switch $70^a$, a circuit is completed through battery 151, lines 153 and 159, switch arm 163, contact 167, line 205, relay arm 206, contact 207, line 209, arm 211 of relay 200, contact 213, contact B, common line 158 and alarm 157.

The cam-actuated switch $71^a$ indicates the level of the chemical solution in the solution containers 148 and 149 supplying the chemical feeders 32. A high solution level sounds the 1.5 volt signalling device 155 as shown in FIG. 4 with a circuit completed through battery 152, lines 154 and 159, switch arm 164, contact 168, line 216, switch arm 217 of tank 148, contact 218, line 219 and signalling device 155; with solution tank 149 being in the circuit through line 216, branch line 223, arm 224, contact 225, branch line 220 and line 219. If the solution level is low, the 6.0 volt alarm is sounded through the circuit of battery 151, lines 153 and 159, arm 164, contact 168, line 216, switch 217, contact 221, line 222, contact C and alarm 157 for tank 148; and if tank 149 is low, the circuit is substantially the same with the tank 149 inserted in the circuit from line 216 by branch line 223, arm 224, contact 226 and branch line 227 to the line 222. As both solution tanks 148,149 are together on the single cam-actuated switch $71^a$, both tanks may sound the 1.5 volt signalling device 155 together, or the 6.0 volt alarm 157 together, or both the 6.0 volt alarm and 1.5 volt signalling device can sound together, depending on the solution levels in the tanks.

Obviously, the 6.0 volt alarm and the 1.5 volt signalling device will have different sounds which can be easily differentiated by the serviceman when calling, and the telephone transmitter is located in close proximity to the signal and alarm. Once the monitoring cycle has been completed, the cam-actuated switches $68^a$, $69^a$, $70^a$ and $71^a$ are all open until the next cycle. Also, the switch $67^a$ is opened to deenergize the relay 122 to depress the telephone cradle $44^a$ to cut off the telephone reciever. Both the pH controller $101^a$ and the conductivity controller $91^a$ each has a separate poser source for actuation of their respective relays.

While the monitoring system and circuit have been shown and described as being advantageously applicable to a cooling tower recirculating system, it is not our desire or intent to unnecessarily limit the scope or the utility of the features of these illustrative embodiments.

We claim:

1. A monitoring system for monitoring and reporting the condition of a multivariable control system whereby each variable is checked by a serviceman remotely located from the control system, comprising a telephone located at the control system and having a bell actuated by a bell coil, a cradle and a reciever-transmitter, a timer actuated by actuation of the bell coil, a plurality of audible sound devices actuated by the timer in a predetermined sequence at predetermined time intervals over a cycle of the timer, sensing devices for the variable conditions in the system, each sensing device connected in a separate circuit with at least one of the audible sound devices and with the timer, said telephone reciever-transmitter being positioned adjacent the audible sound devices to transmit the signals therefrom to the serviceman, said system monitoring a circulating water system, wherein one of said sensing devices is a conductivity meter for the water, said audible sound devices including a buzzer connected in series with said meter, and said timer includes a cam-actuated snap switch connected in series with said buzzer and said meter to complete the circuit therefor, said buzzer being actuated by said meter when the conductivity of the water exceeds a maximum value, said snap switch being actuated by said timer for a short time interval after the timer has been actuated, and a bleed valve to bleed off water from the circulating system, said bleed valve being actuated by a solenoid connected in series with said buzzer and actuated by said conductivity meter when the conductivity of the water exceeds a maximum level.

2. A monitoring system as set forth in claim 1, wherein another of said sensing devices is a pH meter having high and low contacts and a sensor to indicate the pH level of the water as high, low or in range, said audible sound devices including a high pitched buzzer and a low pitched buzzer connected in parallel in a second circuit with the high pitched buzzer connected to the high contact and the low pitched buzzer connected to the low contact of the pH meter, a battery connected in series with the pH meter and with said buzzers, and said timer includes a second cam-actuated switch connected in series with said buzzers and said pH meter and actuated by said timer in sequence with said first mentioned switch, said high pitched buzzer being actuated if the pH of the water exceeds a maximum value and the low pitched buzzer being actuated if the pH is below a minimum value.

3. A monitoring system as set forth in claim 1, in which at least one chemical solution tank feeds a chemical solution additive to said circulating water system, said sensing devices including a pair of electrodes depending into said tank and said solution to adjacent the bottom thereof, said timer including a cam-actuated switch actuated by the timer in sequence with said first mentioned switch, a circuit connecting said last mentioned switch and said electrodes in series, said audible sound devices including a buzzer in series in said last mentioned circuit, and a battery in series in said last mentioned circuit to energize the buzzer when said chemical solution additive completes the circuit between the electrodes.

4. A monitoring system for monitoring and reporting the condition of a multivariable control system whereby each variable is checked by a serviceman remotely located from the control system, comprising a telephone located at the control system and having a bell actuated by a bell coil, a cradle and a receiver-transmitter, a timer actuated by actuation of the bell coil, a pair of audible sound devices comprising a signalling device and an alarm connected in parallel, each powered by a separate battery and actuated at predetermined time intervals over a cycle of the timer, said signalling device indicating an acceptable condition and said alarm indicating a condition requiring correction, sensing devices for the variable conditions in the system, including a pH meter, a conductivity meter and a float-actuated switch in at least one chemical solution tank, each sensing device connected in parallel in a first circuit to said signalling device and connected in parallel in a second circuit to said alarm, said telephone receiver-transmitter being positioned adjacent said signalling device and said alarm to transmit the sounds therefrom to the serviceman.

5. A monitoring system as set forth in claim 4, in which said pH meter has high, low and in range contacts, a first relay connected to said high and in range contacts, a second relay and a latching relay in parallel and connected to said in range and low contacts, said timer including a first cam-actuated switch connected in series with a switch arm of said latching relay and with said signalling device and said alarm, said relay having separate contacts connected in the circuits to said signalling device and to said alarm to be engaged by said switch arm whereby closing of said first cam-actuated switch by said timer actuates said signalling device if the pH has been in proper range and actuates said alarm if the pH range has ever been low.

6. A monitoring system as set forth in claim 5, in which said first relay and said second relay each has a switch arm and a pair of spaced contacts, said timer including a second cam-actuated switch wired in series with said first relay switch arm and with said signalling device and said alarm, one of said first relay contacts connected to said alarm and the other contact connected in series with said second relay switch arm, and one of said second relay contacts connected to said alarm and and the other contact connected to said signalling device, whereby closing of said second cam-actuated switch by said timer actuates said signalling device if the pH is presently in range and actuates said alarm if the pH is either high or low.

7. A monitoring system as set forth in claim 4, in which said conductivity meter has high, low and in range contacts, a first relay connected to said high an in range contacts and a second relay connected to said in range and low contacts, each relay having a switch arm and a pair of spaced contacts, said timer includes a cam-actuated switch connected in series with said first relay switch arm and with said signalling device and said alarm, one of said first relay contacts connected to said alarm and the other contact connected in series with said second relay switch arm, one of said second relay contacts connected to said alarm and the other contact connected to said signalling device, whereby closing of said cam-actuated switch by said timer actuates said signalling device if the conductivity is in range and actuates said alarm if the conductivity is either high or low.

8. A monitoring system as set forth in claim 4, in which said float-actuated switch has a switch arm, a high level contact connected to said signalling device and a low level contact connected to said alarm, said timer including a cam-actuated switch connected to said switch arm and to said signalling device and said alarm, whereby closing of said cam-actuated switch by said timer actuates said signalling device if the float-actuated switch arm engages the high level contact and actuates said alarm if the float-actuated switch arm engages the low level contact.

9. A monitoring system as set forth in claim 4, in which said timer includes at least one cam-actuated switch connected in series with said signalling device and said alarm and connected to each of said pH meter, said conductivity meter and said float-actuated switches, said cam-actuated switches being actuated by said timer in sequence at spaced intervals during a cycle of the timer.